United States Patent [19]
Straitiff et al.

[11] Patent Number: 5,490,214
[45] Date of Patent: Feb. 6, 1996

[54] METHOD AND APPARATUS FOR SELECTIVELY GENERATING CONTROL SIGNALS IN A TELEPHONE SYSTEM

[75] Inventors: David M. Straitiff, Buffalo; Robert R. Drzewiecki, Williamsville, both of N.Y.

[73] Assignee: Voice Technologies Group, Inc., Getzville, N.Y.

[21] Appl. No.: 273,110

[22] Filed: Jul. 8, 1994

[51] Int. Cl.[6] .................................................. H04M 1/53
[52] U.S. Cl. .......................... 379/251; 379/361; 379/279
[58] Field of Search .............................. 379/251, 93, 94, 379/96, 97, 158, 156, 157, 201, 206, 202, 203, 204, 198, 228, 283, 350, 351, 353, 279, 361, 368, 229

[56] References Cited

U.S. PATENT DOCUMENTS

| | | | |
|---|---|---|---|
| 4,107,477 | 8/1978 | Morrison | 379/158 |
| 4,771,450 | 9/1988 | Castro et al. | 379/353 |
| 4,922,527 | 5/1990 | Nonami | 379/361 |
| 4,974,253 | 11/1990 | Hashimoto | 379/97 |
| 5,023,903 | 6/1991 | Bowen | 379/97 |
| 5,228,079 | 7/1993 | Brav | 379/353 |

*Primary Examiner*—Jeffery Hofsass
*Assistant Examiner*—Scott Wolinsky
*Attorney, Agent, or Firm*—Phillips, Lytle, Hitchcock, Blaine & Huber

[57] ABSTRACT

An improvement to a telephone system (10) having a first signal generator (21) which outputs a control signal only when it receives a certain request signal generated by the telephone system's client telephone (12). The invention contemplates a method and apparatus to generate a desired control signal when a request signal incapable of activating the first signal generator is produced by a client telephone (12).

14 Claims, 1 Drawing Sheet

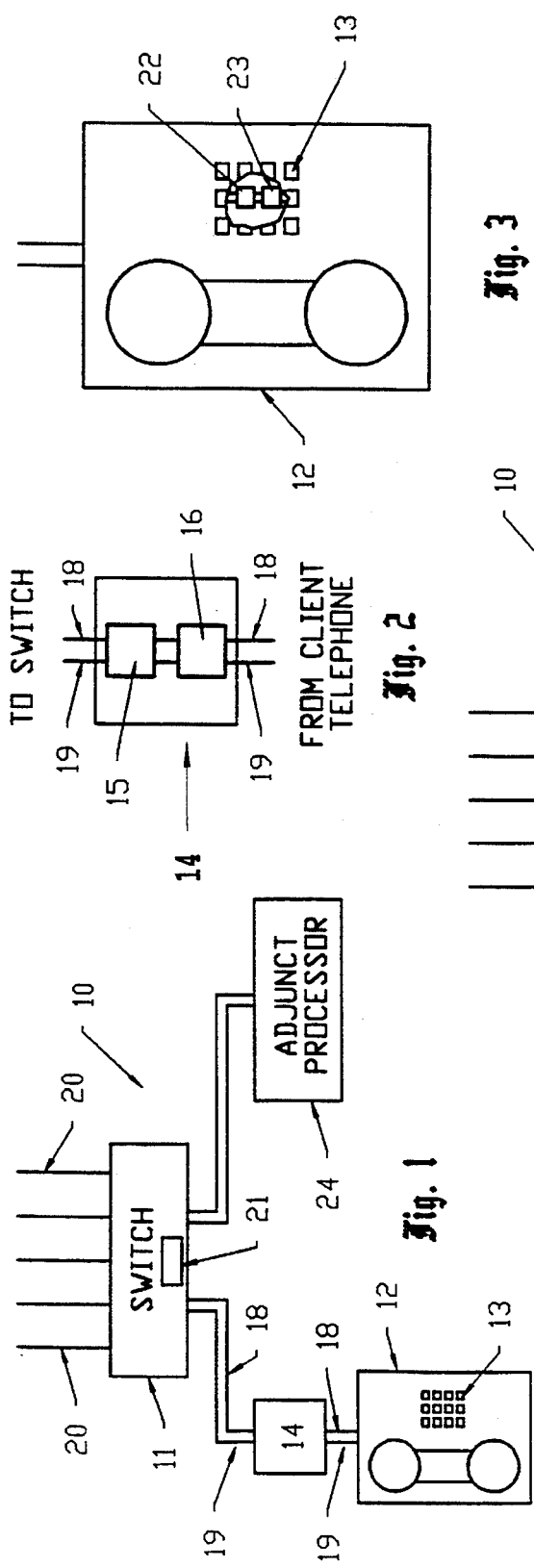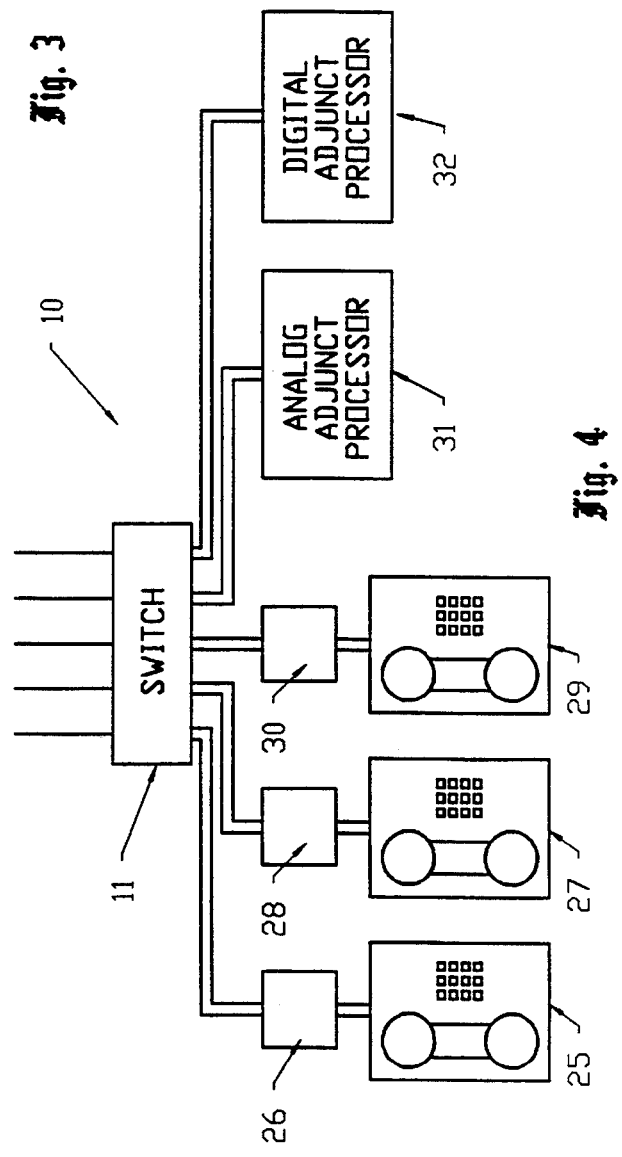

5,490,214

METHOD AND APPARATUS FOR SELECTIVELY GENERATING CONTROL SIGNALS IN A TELEPHONE SYSTEM

TECHNICAL FIELD

This invention relates generally to telephone systems and, more particularly, to a telephone system where an action taken by a client telephone can selectively generate a desired signal.

BACKGROUND ART

Many telephone systems, such as the AT&T MERLIN® and the AT&T System 75® telephone systems, use a limited number of outside telephone lines to service a large number of client telephones. For example, a telephone system switch may connect with four outside telephone lines, but have a capacity to handle ten or more internal client telephones. Client telephones can be fully digital, hybrid or analog. In a digital client telephone, all data and voice information is sent and received in binary data packets along a single pair of digital cables. A hybrid client telephone sends and receives voice information across an analog pair of cables and data across a digital pair of cables. An analog client telephone sends and receives data and voice information across a single analog pair of cables.

Recently, adjunct processors have been developed which connect to telephone systems and increase the system's capabilities. Examples of adjunct processors are voice mail, automated attendant and interactive voice response. Adding an adjunct processor to an existing telephone system allows upgrading and modernization without replacing the entire telephone system, usually a more expensive option.

The functions of many adjunct processors are controlled by receipt of certain signals. In many instances, this control signal is a dual-tone multi-frequency ("DTMF") signal. A DTMF signal can be represented in analog wave form or as a digital data packet. In a telephone system, a client telephone signals the telephone system to generate a DTMF signal when the client telephone's key pad (0–9 plus the # and * keys) is pressed. Many adjunct processors use a DTMF signal as a control means because a DTMF signal's primary function is to "dial" by indicating a desired number. Therefore, most telephones have DTMF signal generation capabilities.

In many telephone systems, the client phones are incapable of independently generating a DTMF signal; the switch possesses a central DTMF signal generator accessed by each client telephone when an outside line is requested. This arrangement reduces the cost of the telephone system by centralizing DTMF signal generation, while still allowing outside dialing and manipulation of adjunct processors connected to other telephone systems. However, this arrangement also forces connection of all desired adjunct processors controlled by a DTMF signal to the telephone system at an outside line port. In effect, the switch recognizes the request from the client telephone for access to an adjunct processor as a request for access to another telephone system. Thus, the request from the client telephone activates the switch's DTMF signal generator, as if the adjunct processor is a device external to the telephone system. This solution has been favored because altering the internal logic of a telephone system switch is expensive, and in many instances, voids warranties on the telephone system itself.

Although connecting adjunct processors through an outside line has been successful, it does so by permanently tying up an outside line, thus, reducing the system's ability to service its client telephones.

A more practical solution is to attach the adjunct processor to a client port of the telephone system switch. However, many telephone systems only allow access to its DTMF generator when an outside line is requested by the client telephone and not when access to another client port is requested.

DISCLOSURE OF THE INVENTION

With parenthetical reference to the corresponding parts, portions or surfaces of the disclosed embodiment merely for purposes of illustration and not by way of limitation, the present invention provides an improvement to a telephone system (e.g. 10) having a switch (e.g. 11), at least one client telephone (e.g. 12) communicating with the switch, each client telephone having a means (e.g. 13) for producing an input and having a first generator (e.g. 21) for selectively generating a first output signal only when output signal is desired and the first signal generator receives certain input. The improvement comprises: a second signal generator (e.g. 15) adapted to selectively generate a second output signal, and a logic means (e.g. 16) capable of activating the second signal generator only when output is desired and the input does not activate the first signal generator to generate the first output signal.

The ability of each client telephone to generate a signal, when desired, without reliance on a signal generator in the telephone switch allows an adjunct processor controlled by the desired signal to be connected to the telephone system at a client telephone port and not an outside line port.

Accordingly, the general object of the invention is to provide conditional signal generation activated by an input from a client telephone in a telephone system without reliance on a conditional signal generator incorporated in the system at its switch.

Another object of the invention is to allow client telephones in a telephone system to access and control adjunct processors connected at a client telephone port instead of an outside line port, thereby freeing outside lines.

These and other objects and advantages will become apparent from the foregoing and ongoing written specification, the drawings, and the appended claims.

BRIEF DESCRIPTION OF THE DRAWINGS

FIG. 1 is a fragmentary schematic of a telephone system incorporating the improvement.

FIG. 2 is an enlarged fragmentary schematic of the logic unit.

FIG. 3 is a fragmentary schematic of a client telephone incorporating the improvement.

FIG. 4 is a schematic of a telephone system incorporating the improvement.

MODES OF CARRYING OUT THE INVENTION

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention.

A telephone system 10 is shown in FIG. 1. The telephone system comprises a switch 11 having multiple outside telephone lines, severally indicated at 20, a hybrid client telephone 12, adjunct processor 24, and logic unit 14. Client telephone 12 is connected to switch 11 by two pair of cables: a digital pair 19 and an analog pair 18. Analog pair 18 carries voice information while digital pair 19 carries only data. Telephone system 10 is designed to allow client telephone 12 to communicate with other client telephones (not shown) for intercom, messaging, conference calling, etc.

Switch 11 contains a first DTMF signal generator 21. When the operator of telephone 12 initially chooses to access an outside line 20, pressing the numeric key pad 13 activates sending of a binary data packet from client telephone 12 to switch 11 along digital pair 19. First DTMF signal generator 21 recognizes the binary data packet, generates an analog DTMF signal and sends this analog DTMF signal along outside line 20 to the local telephone company, where a connection is made to the phone line corresponding to the generated analog DTMF signal.

Telephone system 10 also includes adjunct processor 24 designed to respond to an analog DTMF signal, and logic unit 14 positioned between client telephone 12 and switch 11. If logic unit 14 were to be removed from telephone system 10 and the operator of client telephone 12 requests access to adjunct processor 24, first DTMF signal generator 21 would not generate an analog DTMF signal because client telephone 12 has not requested an outside line 20. Thus, adjunct processor 24 is blind to control signals from client telephone 12.

The inclusion of logic unit 14 compensates for this deficiency. Logic unit 14 generates a DTMF signal if predetermined conditions exist, such as the client telephone sending a request for access to an adjunct processor connected to the telephone system at a client telephone port. Adverting to FIG. 2, when client telephone 12 sends a binary packet toward switch 11 along digital pair 19, logic circuit 16 first decides whether generation of a DTMF signal is needed. If the binary data packet indicates an outside line or an internal intercom connection is desired, the binary data packet passing through logic unit 14 will not generate a DTMF signal. However, if the binary data packet indicates client telephone 12 wishes a connection with adjunct processor 24, logic circuit 14 activates second DTMF signal generator 15, which generates an analog DTMF signal transmitted on analog pair 18. The invention in one embodiment contemplates mutually exclusive DTMF signal generation by the first and second DTMF generators. Switch 11 recognizes the request in the binary data packet to access adjunct processor 24 and routes the binary data pack and the analog DTMF signal accordingly.

The present invention contemplates the generation of conditional DTMF signals in analog or digital form depending on the type of client telephone, the capabilities of the telephone system switch and the requirements of the adjunct processor. Adverting to FIG. 4, a telephone system may include analog, hybrid and digital client telephones, 25, 27 and 29, respectively, along with one adjunct processor 31 controlled by digital DTMF signals and another adjunct processor 32 controlled by analog DTMF signals. Logic units 26, 28 and 30 respond appropriately to the requests of each client telephone. For example, when client telephone 25 requests access to analog adjunct processor 31, logic unit 26 generates the appropriate analog DTMF signal. Conversely, if client telephone 25 requests access to digital adjunct processor 32, logic unit 26 generates the appropriate digital DTMF signal.

Therefore, the invention provides a method and apparatus to allow generation of conditional control signals under conditions when the telephone system normally would not generate a control signal. Conditional control signal generation allows connection of adjunct processors to client telephone ports instead of an outside line port, thus, providing more flexibility.

MODIFICATIONS

The present invention contemplates that various changes and modifications may be made. For example, it is possible to incorporate the functions of external logic unit directly into each client telephone. Adverting to FIG. 3, hybrid client telephone 12 is shown with a logic circuit 23 and a second DTMF signal generator 22 incorporated into its circuits. In this embodiment, the determination to generate a DTMF signal and the generation of a DTMF signal occurs within hybrid client telephone 12 before the binary packet reaches digital pair 19.

Further, the second generator can be adapted to service more than one client telephone, in effect, centralizing second signal generation.

Therefore, while the presently-preferred embodiment of the improved telephone system has been shown and described, and several modifications therein discussed, persons skilled in the art will appreciate that various additional changes and modifications may be made without departing from the spirit of the invention, as defined and differentiated by the following claims.

What is claimed is:

1. In a telephone system comprising a request means capable of outputting a request signal to a plurality of logic means, a first logic means, a first signal generator for selectively generating a desired control signal, a first device located at a first destination, and a second device located at a second destination, said first and second devices adapted to utilize said control signal;

said first logic means specially configured to receive said request signal and to enable said first signal generator to produce said control signal only when said received request signal is a request for said first signal generator to output said control signal to said first destination, the improvement comprising:

a second signal generator for selectively generating said control signal; and a second logic means specially configured to receive said request signal and to enable said second signal generator to output said control signal only when said received request signal is a request for said first signal generator to output said control signal to said second destination.

2. The system as set forth in claim 1 wherein said request means is a client telephone.

3. The system as set forth in claim 1 wherein said control signal is a dual-tone multi-frequency signal.

4. The system as set forth in claim 1 wherein said telephone system is a hybrid telephone system having a pair of analog lines and a pair of digital lines.

5. The system as set forth in claim 4 wherein said control signal is carried by the analog pair of lines.

6. The system as set forth in claim 1 wherein said first and second signal generators are operated on a mutually-exclusive basis.

7. The system set forth in claim 1 wherein said request means is a client telephone, said first destination is an external communication line, said second destination is an internal communication line and said second device is an adjunct processor.

8. A method of operating a telephone system, comprising the steps of:

providing said telephone system with a first signal generator adapted to output a control signal;

providing said telephone system with a first logic means adapted to control the output of said control signal by said first signal generator;

providing said telephone system with a first device at a first destination, said first device configured to utilize said control signal;

providing said telephone system with a second signal generator adapted to output said control signal;

providing said telephone system with a second logic means adapted to control the output of said control signal by said second signal generator;

providing said telephone system with a second device at a second destination, said second device configured to utilize said control signal;

providing said telephone system with a request means adapted to output a request signal to said first and second logic means;

said first logic means causing said first signal generator to selectively output said control signal only when said request signal is a request for said first signal generator to output said control signal to said first destination; and said second logic means causing said second signal generator to selectively output said control signal only when said request signal is a request for said first signal generator to output said control signal to said second destination.

9. The method as set forth in claim 8 wherein said request means is a client telephone.

10. The method as set forth in claim 8 wherein said control signal is a dual-tone multi-frequency signal.

11. The method as set forth in claim 8 wherein said telephone system is a hybrid telephone system having a pair of analog lines and a pair of digital lines.

12. The method as set forth in claim 11 wherein said control signal is carried by the analog pair of lines.

13. The method as set forth in claim 8 wherein said first and second signal generators are operated on a mutually-exclusive basis.

14. The method set forth in claim 8 wherein said request means is a client telephone, said first destination is an external communication line, said second destination is an internal communication line and said second device is an adjunct processor.

\* \* \* \* \*